Figure 1:
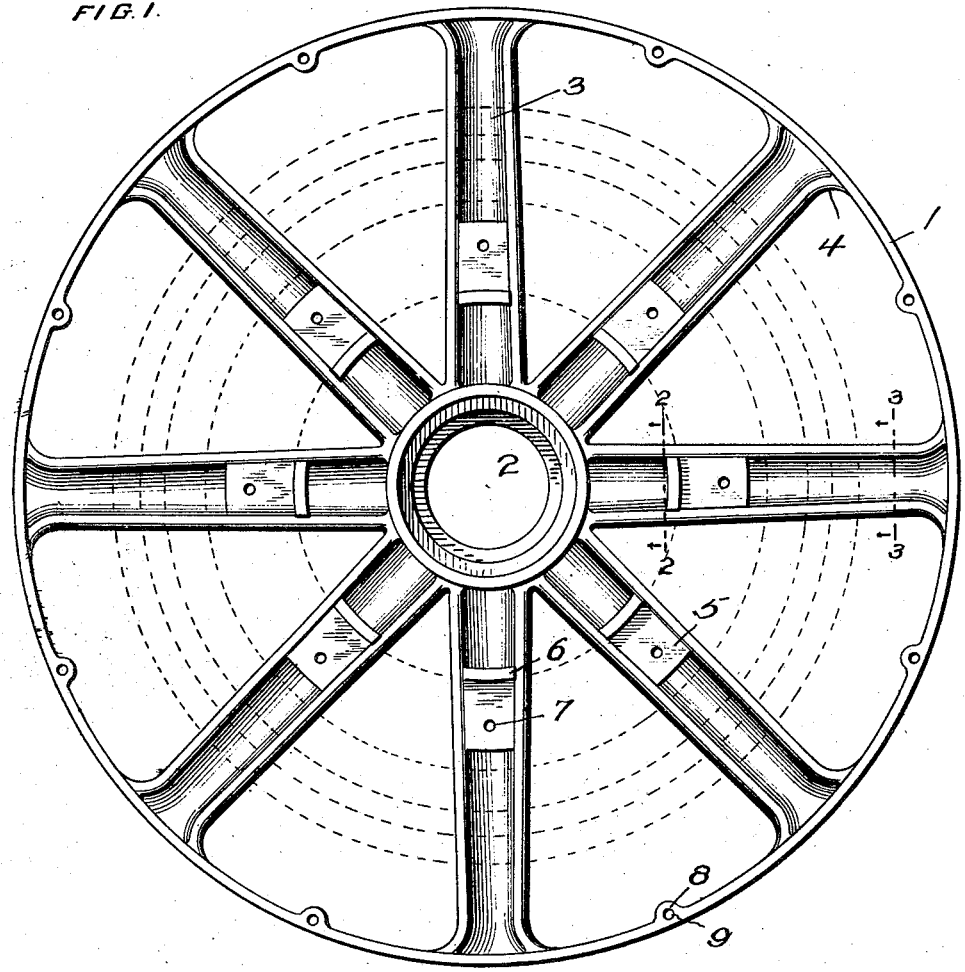

A. F. S. BLACKWOOD.
WHEEL.
APPLICATION FILED JAN. 10, 1913.

1,201,926.

Patented Oct. 17, 1916.
2 SHEETS—SHEET 1.

WITNESSES

INVENTOR
Alexander F. S. Blackwood.
by A. P. Greeley Attorney

A. F. S. BLACKWOOD.
WHEEL.
APPLICATION FILED JAN. 10, 1913.

1,201,926.

Patented Oct. 17, 1916.
2 SHEETS—SHEET 2.

WITNESSES
Parker Cook

INVENTOR
Alexander F. S. Blackwood
by A. P. Greeley Attorney

UNITED STATES PATENT OFFICE.

ALEXANDER FORBES STIRLING BLACKWOOD, OF DETROIT, MICHIGAN, ASSIGNOR TO THE BLACKWOOD STEEL FOUNDRY COMPANY, OF SPRINGFIELD, OHIO, A CORPORATION OF INDIANA.

WHEEL.

1,201,926.      Specification of Letters Patent.      Patented Oct. 17, 1916.

Application filed January 10, 1913. Serial No. 741,202.

*To all whom it may concern:*

Be it known that I, ALEXANDER F. S. BLACKWOOD, a citizen of the United States, residing at Detroit, in the county of Wayne, State of Michigan, have invented certain new and useful Improvements in Wheels, of which the following is a description, reference being had to the accompanying drawings, forming a part hereof.

My invention relates to new and useful improvements in wheels and more particularly to cast wheels especially adapted for automobile trucks or automobiles. It has been found that although the ordinary form of wooden wheels may be used for automobile trucks or other forms of automobiles there is great danger at all times in wheels breaking or giving way under the strain, and this especially so if the automobile truck is a large one and heavily loaded.

An object of my invention is to produce a wheel that will stand this great weight and strain and at the same time produce a wheel that is relatively light in weight and cheap to manufacture.

With these and other objects in view my invention consists in certain new and novel constructions and combinations of parts as will be hereinafter more fully described and pointed out in the claim.

In the drawing accompanying this specification and forming a part thereof the preferable form of my invention is illustrated, in which—

Figure 2:
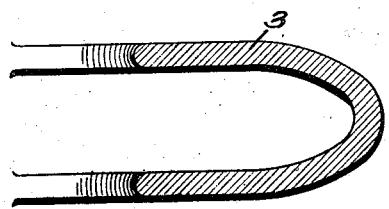
Figure 3:
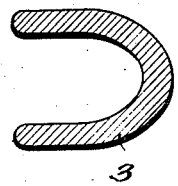
Figure 4:
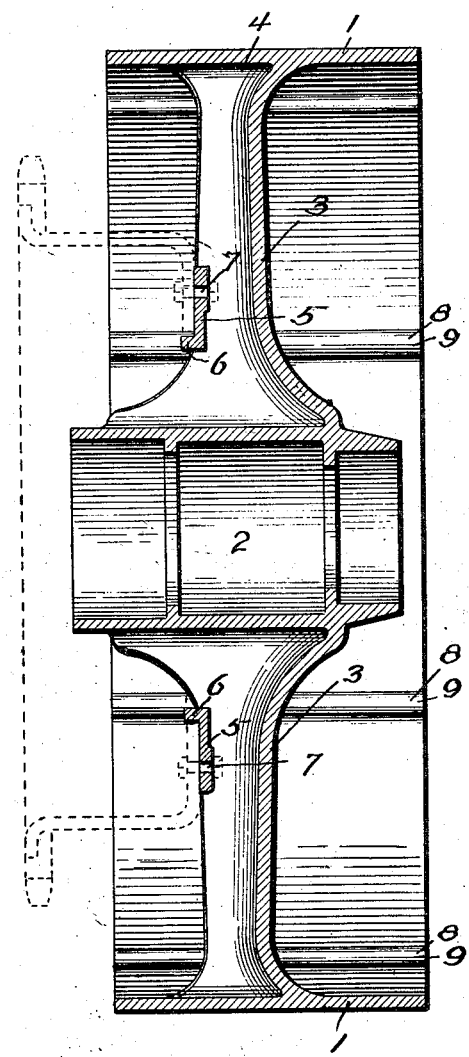
Figure 5:
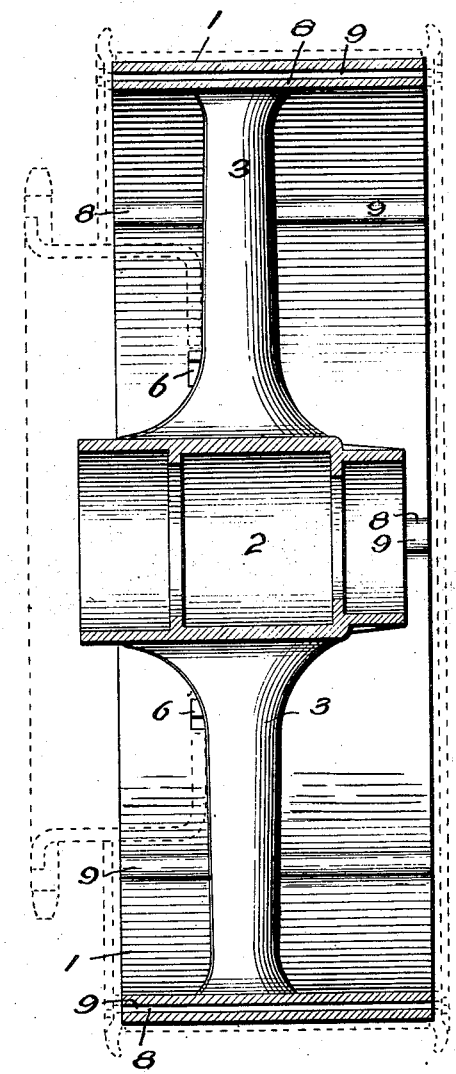

Figure 1 is a view in elevation showing on the inner face of my improved wheel. Fig. 2 is a sectional view of a spoke taken on a line 2—2 of Fig. 1 in the direction of the arrow. Fig. 3 is a similar view taken on line 3—3 of Fig. 1 taken in the direction of the arrow. Fig. 4 is a vertical sectional view of my improved wheel, the dotted lines showing a brake and sprocket attached: and Fig. 5 is also a vertical sectional view in an altered position, the dotted lines showing a rim and sprocket attached.

Referring now to the drawing in which similar reference numerals designate corresponding parts throughout the several views, 1 is the rim of the wheel which may be of any width or desired thickness and 2 is the hub which is made of any conventional form, it being understood, however, that it is an integral part of the wheel.

The spokes 3 are cast integral with the hub 2 and rim 1 and are formed U shape in cross section as clearly shown in Figs. 2 and 3. Their internal diameter slightly decreases from the hub 2 to a point 4 near the rim 1 where they are then flared and merged in said rim. By forming the said spokes 3 U shaped in cross section the maximum amount of strength is gained for the amount of metal used. Cast integral with said spokes 3 and across their inner faces are what I term pads 5 which are provided with an outwardly extending lug 6 as clearly shown in Fig. 4. Each pad is drilled as at 7 so that a brake band and sprocket may be bolted or fastened thereto as shown in the dotted lines in Fig. 4, the inner end or portion of said band contacting with the lug 6 of the pad. On the inner face of the rim 1 of my improved wheel and spaced at an equal distance from the spokes and extending axially across the rim are cast enlarged portions 8 and these portions are then axially drilled as shown at 9. By so forming these enlarged portions on the inner rim of the wheel, tire rings may be bolted on said rim as shown by the dotted lines in Fig. 5 and a tire may be replaced with the simplicity and ease as is possible with the ordinary form of wooden wheel now in use.

From the foregoing it will be seen that I have produced a relatively light wheel and at the same time a wheel capable of withstanding a tremendous crushing strength. The wheel may of course be cast of steel or malleable iron or any metal that I find most suitable. The spokes being U shaped in cross section will have the same outward appearance as the ordinary wooden spoke and at the same time be capable of standing a crushing strength that is not possible for any wooden spoke to stand up under.

Having thus described my invention what I claim as new and desire to secure by Letters Patent is:

A cast metal wheel formed in one piece comprising a hub, rim and spokes connecting the hub and rim, the spokes being U shaped in cross section with the opening turned toward the inside of the wheel, and being each provided between its ends with a pad spanning the U and flush with its ends serving to strengthen the spoke and afford a bearing for attachment of a gear wheel or the like, and arranged to afford a space between it and the interior of the U for the end of the attaching means.

This specification signed and witnessed this twenty-sixth day of December, A. D. 1912.

ALEXANDER FORBES STIRLING BLACKWOOD.

In the presence of—
  P. BLACKWOOD,
  A. F. RUPP.